United States Patent
Gillilan et al.

(10) Patent No.: US 11,982,735 B2
(45) Date of Patent: May 14, 2024

(54) SYSTEMS AND METHODS OF HIGH SPEED SCRUBBING OF AIRSPACE RADAR RETURNS

(71) Applicant: RavenOPS, Inc., San Francisco, CA (US)

(72) Inventors: Delaney Gillilan, Las Vegas, NV (US); Joshua Ouellette, San Francisco, CA (US); Randall Shults, San Francisco, CA (US); Thomas Balough, San Francisco, CA (US)

(73) Assignee: RavenOPS, Inc., San Francisco, CA (US)

( * ) Notice: Subject to any disclaimer, the term of this patent is extended or adjusted under 35 U.S.C. 154(b) by 920 days.

(21) Appl. No.: 16/992,949

(22) Filed: Aug. 13, 2020

(65) Prior Publication Data

US 2021/0263144 A1 Aug. 26, 2021

Related U.S. Application Data

(60) Provisional application No. 62/981,896, filed on Feb. 26, 2020.

(51) Int. Cl.
| | |
|---|---|
| *G01S 13/66* | (2006.01) |
| *G01S 13/91* | (2006.01) |
| *G06F 7/483* | (2006.01) |
| *G06F 7/499* | (2006.01) |
| *G06T 1/20* | (2006.01) |
| *G06T 15/00* | (2011.01) |

(Continued)

(52) U.S. Cl.
CPC .............. *G01S 13/91* (2013.01); *G01S 13/66* (2013.01); *G06F 7/483* (2013.01); *G06F 7/49936* (2013.01); *G06T 1/20* (2013.01); *G06T 15/005* (2013.01); *G06F 9/3877* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 7,847,725 B1 * | 12/2010 | Houlberg | ................ | G01S 7/046 342/182 |
| 10,598,780 B2 * | 3/2020 | Bellett | .................... | G01S 7/295 |

(Continued)

*Primary Examiner* — Joni Hsu
(74) *Attorney, Agent, or Firm* — Foley & Lardner LLP

(57) ABSTRACT

High speed scrubbing of airspace radar returns is provided. A system can include a central processing unit ("CPU") and a graphical processing unit ("GPU"). The CPU loads time-ordered airspace radar return data that includes radar returns each encoded as an object with location information, time information, and property information. The GPU generates arrays including the location information, the time information, and the property information reorganized into a location array, a time array, and a property-based array. The GPU receives an indication to scrub a display of at least a portion of the airspace radar return data to a time window prior to a current display time or subsequent to the current display time. The GPU retrieves, from the arrays, a location entry and a property-based entry that satisfy the time window. The GPU renders frames with pixels corresponding to the location entry, the time entry, and the property-based entry.

18 Claims, 8 Drawing Sheets

(51) Int. Cl.
*G06F 9/38* (2018.01)
*G06F 9/54* (2006.01)

(56) References Cited

U.S. PATENT DOCUMENTS

| | | | | |
|---|---|---|---|---|
| 2010/0315281 | A1* | 12/2010 | Askelson | G08G 5/0013 703/2 |
| 2011/0109492 | A1* | 5/2011 | Nakahama | G01S 7/41 342/89 |
| 2012/0317506 | A1* | 12/2012 | Zhao | G06F 3/14 715/764 |
| 2016/0061948 | A1* | 3/2016 | Ton | G01S 7/4004 342/22 |
| 2018/0149745 | A1* | 5/2018 | Christianson | G01S 7/062 |
| 2020/0386884 | A1* | 12/2020 | Dillard | G01S 7/411 |

\* cited by examiner

SYSTEMS AND METHODS OF HIGH SPEED SCRUBBING OF AIRSPACE RADAR RETURNS

CROSS-REFERENCES TO RELATED APPLICATIONS

This application claims the benefit of priority under 35 U.S.C. § 119(e) to U.S. Provisional Patent Application No. 62/981,896, filed on Feb. 26, 2020, and titled "SYSTEMS AND METHODS OF HIGH SPEED SCRUBBING OF AIRSPACE RADAR RETURNS," which is hereby incorporated herein by reference in its entirety.

BACKGROUND OF THE DISCLOSURE

A system can provide a visual display of airspace radar returns. The airspace radar returns can provide an indication of objects that are in an airspace. However, as the number of objects that are moving in an airspace increase, it can be challenging to accurately and reliably identify the objects, as well as render the airspace radar returns for display.

SUMMARY OF THE DISCLOSURE

Systems, methods and apparatus of the present technical solution are directed to high speed scrubbing of airspace radar returns. At least one aspect of this technical solution is directed to a system to scrub airspace radar returns. The system includes a data processing system including one or more central processing units ("CPUs") and one or more graphical processing units ("GPUs"). The one or more CPUs can load, in an application buffer of the data processing system, time-ordered airspace radar return data. The time-ordered airspace radar return data can include radar returns each encoded as an object including location information, time information, and property information. The one or more CPUs can provide, to the one or more GPUs, the time-ordered airspace radar return data. The one or more GPUs can allocate, in memory of the one or more GPUs, buffers. The one or more GPUs can generate, for storage in the buffers, arrays with the location information, the time information, and the property information reorganized into a location array, a time array, and a property-based array. The one or more GPUs can receive an indication to scrub a display of at least a portion of the airspace radar return data to a time window prior to a current display time or subsequent to the current display time. The one or more GPUs can identify, responsive to the indication to scrub the display to the time window, one or more time entries in the time array stored in memory of the one or more GPUs that satisfy the time window. The one or more GPUs can retrieve, from the location array and the property-based array stored in memory of the one or more GPUs, one or more location entries and one or more property-based entries that correspond to the one or more time entries that satisfy the time window. The one or more GPUs can render, for display via a display device of the data processing system, one or more frames with one or more pixels corresponding to the one or more location entries, the one or more time entries, and the one or more property-based entries that satisfy the time window.

At least one aspect of the technical solution is directed to a method of scrubbing airspace radar returns. The method can be performed by a data processing system including one or more central processing units ("CPUs") and one or more graphical processing units ("GPUs"). The method can include the one or more CPUs loading, in an application buffer of the data processing system, time-ordered airspace radar return data. The time-ordered airspace radar return data can include radar returns each encoded as an object including location information, time information, and property information. The method can include the one or more CPUs providing, to the one or more GPUs, the time-ordered airspace radar return data. The method can include the one or more GPUs allocating, in memory of the one or more GPUs, buffers. The method can include the one or more GPUs generating, for storage in the buffers, arrays with the location information, the time information, and the property information reorganized into a location array, a time array, and a property-based array. The method can include the one or more GPUs receiving an indication to scrub a display of at least a portion of the airspace radar return data to a time window prior to a current display time or subsequent to the current display time. The method can include the one or more GPUs identifying, responsive to the indication to scrub the display to the time window, one or more time entries in the time array stored in memory of the one or more GPUs that satisfy the time window. The method can include the one or more GPUs retrieving, from the location array and the property-based array stored in memory of the one or more GPUs, one or more location entries and one or more property-based entries that correspond to the one or more time entries that satisfy the time window. The method can include the one or more GPUs rendering, for display via a display device of the data processing system, one or more frames with one or more pixels corresponding to the one or more location entries, the one or more time entries, and the one or more property-based entries that satisfy the time window.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims

DETAILED DESCRIPTION OF THE DISCLOSURE

Systems, methods, and apparatus of this technical solution are directed to high speed scrubbing of airspace radar returns. For example, the technical solution can provide a visual display to operators, such as military personnel, that are monitoring air traffic data from one or more radar sites. The visual display can allow the operator to understand the flow of air traffic, determine whether any aircraft are behaving improperly on anomalously relative to a desired or expected behavior, and classify any ambiguous radar returns that may be aircraft, weather, birds or noise.

However, as the amount of radar returns increase, it can be challenging for computing devices to efficiently and effectively process and render the radar return data for visual display. For example, a large number of radar returns that are moving in the same direction at a low speed may indicate a cluster of precipitation. In another example, seeing three or four hours of air traffic flow played back at high speed may indicate a sense of whether or not the behavior of a single aircraft is normal or abnormal. However, it can be computationally challenging to render the radar returns in an efficient manner that allows for effective monitoring or classification of ambiguous radar returns.

Figure 1A:
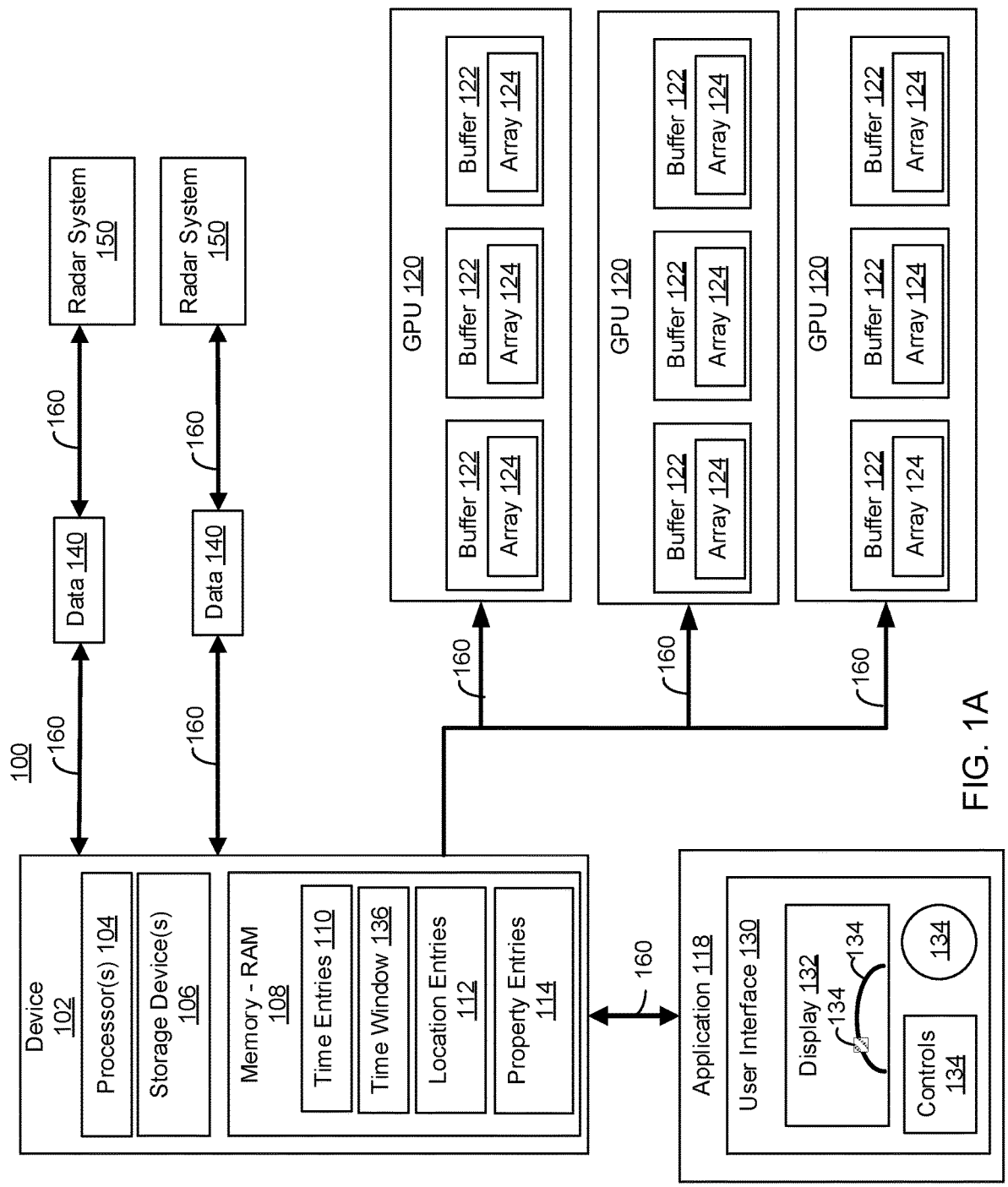
FIG. 1A is a block diagram of a system for high speed scrubbing of airspace radar returns.

Thus, systems and methods of this technical solution provide high speed scrubbing of airspace radar returns. Scrubbing can refer to an interaction via a user interface in which an operator provides an indication to navigate to a different time window or portion of the visual display or the airspace radar returns. The user interface can include software or hardware. For example, the interface can include a scroll wheel, scroll bar, timeline bar for scrubbing (e.g., as depicted in FIG. 1A), or other user interface element. Thus, rather than play back only the current state of the airspace such that the previous airspace radar return data slowly fades away over a time interval, this technical solution can render airspace radar returns backwards in time to a previous time window, as well as forward in time from throughout the previous time window. By scrubbing the airspace radar returns, this technical solution can provide additional context around the airspace radar returns, provide information regarding the behavior of the objects in the airspace, and provide a historical view of the airspace radar returns, such as where a track came from and what the track was doing during a previous time window. This technical solution can render the previous time window in a continuous manner without causing a discontinuous jump back in time to a previous timestamp, and then playing forward the recorded radar data. By rendering previous time windows in a smooth, continuous manner, the systems and methods of this technical solution can improve the efficiency and efficacy which a computing device can render potentially tens of thousands of radar returns, thereby allowing the operator to track a target from the current time back through a previous time window without having to guess which dot is the target of interest. Furthermore, by providing a continuous, smooth display that facilitates target detection and classification, the operator may be less likely to repeatedly view the radar returns, thereby reducing the computing resource utilization.

To do so, the systems and methods of the technical solution provide for "scrubbing" or airspace radar returns in which the airspace radar returns can be rendered for visual display backward and forward in time. The technical solution improves the computing performance of rendering airspace radar returns in order to provide a smooth appearance for scrubbing that scales up to large number of radar returns (e.g., tens of thousands), while maintaining dynamic filtering, interactivity and the ability to change the visualization criteria in real-time. The system can render the airspace radar returns in either direction at a desired speed controlled by the operator (e.g., user of the system). The system can use continuous time steps forward and backward to avoid the discontinuity problem of jumping, and provide precise control over the speed of playback of the airspace radar returns. Thus, this technical solution can render airspace radar returns via an application (e.g., a web browser) and provide for scrubbing of a large number of airspace radar returns in a smooth, low lag manner, with dynamic interactivity (e.g., allow for the selection of different subsets of the data to display, change styling or change attributes of the display).

An application can load raw radar returns data in memory (e.g., random access memory) controlled by a central processing unit ("CPU"). Transferring the radar returns data from the memory controlled by the CPU to memory controlled by a graphical processing unit ("GPU") can introduce a bottleneck or delay (e.g., 500 milliseconds) in the process. As such, loading the raw radar data into the GPU can introduce significant computing overhead, because the raw radar data can include millions of points. To render the radar returns and perform actions such as animating, filtering, or updating data, the transfer process may be repeated one or more times, thereby introducing further processing delays or bottleneck.

The system or GPU can dynamically select a shading level or shaders with different linear functions in the rendering process allowing the user to dynamically interact with the display by, for example, selecting different combinations of returns to view, changing the trail length of radar blips, or adjusting coloring. The GPU can provide a 3-dimensional view of the data while allowing panning, rotating, and zooming. This is repeated across all of the entries in the various data buffers for each frame, but since the GPU can be configured with parallel processing, the GPU can efficiently execute these operations to provide a result quickly and without delays or lag. The organization of the data can allow the system to render the desired returns within a specific time window efficiently without having to move the underlying data around in memory. The system can update the data (e.g., load new data) stored in the memory of the GPU. To update the data efficiently, the GPU can perform a large "block" movement of buffers, which can be more efficient than loading smaller objects or appending/prepending data to buffers. The GPU buffers can be time-ordered, and the data can be sorted by time stamp either by the server or on the CPU side before data is transferred to the GPU.

The GPU can add new data by allocating a new buffer the size of the old buffer plus the new data, then bulk-copying both sets of data into the new buffer and deallocating the old buffer. The GPU can perform this update more efficiently using a small number of large buffers as compared to changing data within a buffer. When the GPU makes space for new data, the GPU can utilize a similar process without copying some portion of the old buffer to the new buffer. The GPU can perform this update when new data becomes available.

Systems and methods of this technical solution can provide for a computationally efficient and smooth scrubbing of airspace radar returns, while also providing dynamic interactivity with the visual display, unlike a pre-rendered image file which is static and precomputed.

Referring to FIG. 1A, depicted is a block diagram of one embodiment of a computing environment 100 having a device 102 to receive data 140 (e.g., radar returns) from one or more radar systems 150 and generate a display 132 to provide the radar return data for interactive monitoring of the data 140 rendered in the display 132. The device 102 can provide the display 132 through a user interface 130 and enable dynamic modification and/or scrubbing of data 140 within the display 132 to, for example, move the data 140 backward in time and/or forward in time and determine behavioral properties of the data 140. In some embodiments, the device 102 can enable dynamic modification and/or scrubbing of data 140 within the display 132 to determine abnormalities in a flight path of an aircraft or determine if radar returns correspond to an aircraft or weather or flock of birds.

The computing environment 100 (e.g., private network, public cloud) can include a plurality of radar systems 150 connected to the device 102 through one or more connections 160 to provide radar return data 140 to the device 102. The device 102 can be implemented using hardware or a combination of software and hardware. For example, components of the device 102 can include logical circuitry (e.g., a central processing unit or CPU) that responds to and processes instructions fetched from a memory unit (e.g., storage device 106). Components of the device 102 can include or use a microprocessor or a multi-core processor. A multi-core processor can include two or more processing units (e.g., processor 104) on a single computing component. Components of the device 102 can be based on any of these processors, or any other processor capable of operating as described herein. Processors can utilize instruction level parallelism, thread level parallelism, different levels of cache, etc. For example, the device 102 can include at least one logic device such as a computing device or server having at least one processor 104 to communicate with one or more radar systems 150. The components and elements of the device 102 can be separate components or a single component. The device 102 can include a memory component (e.g., storage device 106, memory 108) to store and retrieve data 140 (e.g., radar return data). The memory 108 can include a random access memory (RAM) or other dynamic storage device, coupled with the storage device 106 for storing information, and instructions to be executed by the device 102. The memory 108 can include at least one read only memory (ROM) or other static storage device coupled with the storage device 106 for storing static information and instructions for the device 102. The memory can include a storage device 106, such as a solid state device, magnetic disk or optical disk, to persistently store information and instructions. The device 102 can be the same as or substantially similar to computer system 400 of FIG. 4.

The device 102 can include a processor 104. The processor 104 can include non-volatile memory that stores computer instructions and an operating system. For example, the computer instructions can be executed by the processor 104 out of volatile memory to perform all or part of the method 200. In some embodiments, the device 102 can include a non-transitory computer-readable medium, comprising instructions that, when executed by the processor 104 of the device 102, cause the processor 104 to perform all or part of the method 200. The processor 104 can include a database and be configured to generate and/or store values including, but not limited to, data 140, time entries 110, location entries 112 and property entries 114. The processor 104 can be the same as or substantially similar to processor 450 of FIG. 4. The memory 108 can be the same as or substantially similar to main memory 455, ROM 420 and/or storage device 425 of FIG. 4.

The device 102 group the data 140 into different entries based part on a type of data 140. For example, the device 102 can generate time entries 110 for time data 140 or time information associated with one or radar returns. The time entries 110 can include a timestamp (e.g., time value, time range) assigned to the radar return data 140 received from the radar systems 150. The timestamp can indicate a time when the data 140 of the respective radar return was recorded. The device 102 can generate location entries 112 for location data 140 or location information associated with one or radar returns. The location entries 112 can include location information, longitude information, latitude information and/or coordinates corresponding to the radar return data 140 received from the radar systems 150. The location information can indicate the location or area that the data 140 of the respective radar return was recorded. The device 102 can generate property entries 114 for property data 140 or property information associated with one or radar returns. The property entries 114 can include property information of the radar return data 140 received from the radar systems 150. For example, the property information can include, but is not limited to, elevation, radar return type (e.g., search only, transponder only, or reinforced with both), track type, radar system 150 detecting the object, or other properties. The device 102 can generate one or more different types of property entries 114 such that similar property types are grouped together. The property information can include a variety of different forms of information and properties of parameters and variables used to detect and monitor a flight path of an object. The property information can include of the data 140 and/or equipment used to detect and monitor the flight path of an object. In embodiments, the property information can include an elevation value for a detected object, a radar return type used to detect and/or monitor the object, and/or an identifier (e.g., name, location) of a radar system 150 detecting the object. The property information can include a parameter for received data 140, a parameter for a detected object (e.g., aircraft, flight path), a parameter for a flight path, a parameter for a track, a type of object, a type of flight path and/or a type of track.

The device 102 can include one or more central processing units 104 (e.g., processor 104) and one or more graphical processing units (GPUs) 120. The central processing units 104 can be the same as or substantially similar to processor 450 of FIG. 4. The GPUs 120 can include or be implemented using hardware or a combination of software and hardware. The GPUs 120 can include an electronic circuit designed to manipulate and alter memory to accelerate the creation of images in a buffer 122 or array 124 intended for output to a display 132 of the device 102. The number of GPUs 120 can vary and can be selected based at least in part on the amount of data 140 to be stored and maintained in buffers 122 and/or arrays 124 of the GPUs 120.

The buffers 122 can include a data buffer or a region of a respective GPU 120 (e.g., region of memory) used to store (e.g., temporarily store) data 140. The device 102 can store the data 140 in one or more buffers 122 during processing of the data 140 and prior to displaying the data 140. In embodiments, one or more buffers 122 can be a different size (e.g., different storage capacity) from one or more other buffers 122. In some embodiments, each of the buffers 122 can be the same size. The number of buffers 122 can vary and can be selected based at least in part on the amount of data 140 to be stored and maintained and/or the number of different types of data 140.

The device 102 can generate one or more arrays 124 to group and organize the data 140 in the buffers 122. The device 102 can group data 140 of a similar type (e.g. time data, location data, property data) into a common array 124. In embodiments, each array 124 can include homogenous data 140 or data 140 related to or representing the same characteristic or property. The number of arrays 124 can vary and can be selected based at least in part on the number of different types of data 140.

The device 102 can include one or more user interfaces 130 (e.g., graphical user interfaces). The user interface 130 can provide or enable scrubbing functionality through instructions received via one or more controls 134 for scrubbing airspace radar returns. The user interface 130 can be provided or presented via an application 118, such as a web browser. The user interface 130 can include an input device and/or a graphical user interface (GIU). The user interface 130 can include a display 132 and one or more controls 134. The display 132 can include a GUI and/or touch screen display. The display 132 can be the same as or substantially similar to display 435 of FIG. 4. The controls 134 can include input devices, buttons, keyboard or voice interface for communicating information and commands to the device 102. The controls 134 can include icons on the display 132 to enable interaction with data 140 provided within the display 132. In some embodiments, the controls 134 can include controls to generate a display 132, play, stop, pause, move backward in time, move forward in time and/or scroll one or more time windows 136 backward in time and/or forward in time. The controls 134 can include a cursor control, such as a mouse, a trackball, or cursor direction keys, for communicating direction information and command selections to the device 102 and for controlling cursor movement on the display 132. The controls 134 can include controls to modify a size, a color, property info, and/or opacity of data 140 or objects provided through display 132. The controls 134 can include pan functionality, zoom functionality, and/or rotate functionality to rotate a frame or scene provided through display 132. The controls 134 can be the same as or substantially similar to input device 430 of FIG. 4.

The user interface 130 can be a component of the device 102 to enable a user to interact with the device 102 and provide one or more instructions (e.g., scrubbing instructions, display modifications) to modify data 140 in display 132 through controls 134. In some embodiments, the user interface 130 can be a component of a client device connected to the device 102 through one or more connections 160 to enable a user to interact with the device 102 and provide one or more instructions (e.g., scrubbing instructions, display modifications) to modify data 140 in display 132 through controls 134.

In embodiments, the user interface 130 can include dynamic controls 134. For example, the controls 134 can include a timeline bar 134 (e.g., semi-circular, horizontal, or other type of timeline bar) for scrubbing and a pointer 134. The device 102 can receive a scrubbing instruction through the timeline bar 134 and pointer 134 responsive to a movement of the pointer 134 along or across the timeline bar 134. The direction of movement in the time domain and speed of movement in the time domain can be arbitrary and controlled by a user through interaction (e.g., touch screen, click on, engage) with the controls 134. The direction and speed of the scrubbing, backward in time or forward in time, can be determined based in part of the direction of the movement and a speed of the movement of the pointer 134 along or across the timeline bar 134. The controls 134 can include multiple different types of control buttons, input devices or interaction devices. In embodiments, the controls 134 can include a hardware wheel 134 or hardware device, such as but not limited to, a scroll wheel on a mouse, or an external jog wheel. The controls 134 can generate instructions for device 102 to enable dynamic scrubbing, looping and boomeranging back and forth, and repeating playback.

In some embodiments, the controls 134 can include controls to modify a visual property or visual presentation of data 140 within a display 132. For example, the controls 134 can include controls for color coding, color shading, and/or modifying a color of data 140 provided through display 132. The device 102 can illustrate different types of data 140, different radar return data 140 or different objects having different colors to differentiate between the different types of data 140, different radar return data 140 or different objects. The device 102 can enable color shading or color highlighting functionality to shade one or more radar returns or objects and/or highlight one or more radar returns or objects to make the highlighted data 140 more prominent or easier to view through display 132. In some embodiments, the color coding applied by the device 102 can be determined based on the type of radar return and/or a trackID. The device 102 can dynamically redraw data 140 (e.g., radar returns) and draw the data 140 in three dimensions responsive to instruction via one or more controls 134.

The user interface 130 can include an input device and/or a graphical user interface (GIU). The user interface 130 can include a display 132 and one or more controls 134. The display 132 can include a GUI and/or touch screen display. The display 132 can be the same as or substantially similar to display 435 of FIG. 4. The controls 134 can include input devices, buttons, keyboard or voice interface for communicating information and commands to the device 102. The controls 134 can include icons on the display 132 to enable interaction with data 140 provided within the display 132. In some embodiments, the controls 134 can include controls to generate a display 132, play, stop, pause, move backward in time, move forward in time and/or scroll one or more time windows 136 backward in time and/or forward in time. The controls 134 can include a cursor control, such as a mouse, a trackball, or cursor direction keys, for communicating direction information and command selections to the device 102 and for controlling cursor movement on the display 132. The controls 134 can be the same as or substantially similar to input device 430 of FIG. 4. The user interface 130 can be a component of the device 102 to enable a user to interact with the device 102 and provide one or more instructions (e.g., scrubbing instructions, display modifications) to modify data 140 in display 132 through controls 134. In some embodiments, the user interface 130 can be a component of a client device connected to the device 102 through one or more connections 160 to enable a user to interact with the device 102 and provide one or more instructions (e.g., scrubbing instructions, display modifications) to modify data 140 in display 132 through controls 134.

The radar systems 150 can include or correspond to radar sites or processing systems connected to radar sites to record and transmit radar return data 140. The radar systems 150 can be disconnected from one another, use different radar technologies, use different radar formats, or otherwise be independent from one another. The radar systems 150 can be referred to as a heterogeneous set of radar of systems 150 that collect radar return data 140. Due to the disconnected and heterogeneous nature of the multiple radar systems 150, it can be technically challenging for a single user or system to process or display the data from the multiple radar systems 150 in an efficient and effective manner that facilitates classifying aircraft based on flight tracks. Thus, systems and methods of this technical solution can receive and process radar return data from multiple, different radar systems 150 to provide real-time scrubbing and playback to facilitate classifying aircraft based on their flight tracks.

The radar systems 150 can detect and record range, angle and/or velocity of one or more objects moving or passing through a field of view of the respective radar system 150. The radar systems 150 can determine time data 140, location data 140 and/or property data 140 for one or more objects within a field of view of the respective radar system 150. The radar systems 150 can generate and transmit data 140 (e.g., radar return data) to the device 102 through one or more connections 160. The connections 160 can include a channel, connection or session between the device 102 and a radar system 150. The connection 160 can include a secure connection and/or encrypted connection established between the device 102 and the respective radar system 150. The encrypted connection 160 can include an encrypted file, encrypted data or traffic transmitted between the radar system 150 and the device 102.

The above-mentioned elements or entities may be implemented in hardware, or a combination of hardware and software, in one or more embodiments. Components of the device 102 may be implemented using hardware or a combination of hardware or software detailed above in connection with FIGS. 1A-1B. For instance, these elements or entities can include any application, program, library, script, task, service, process or any type and form of executable instructions executing on hardware of a device (e.g., device 102). The hardware includes circuitry such as one or more processors in one or more embodiments.

Figure 1B:
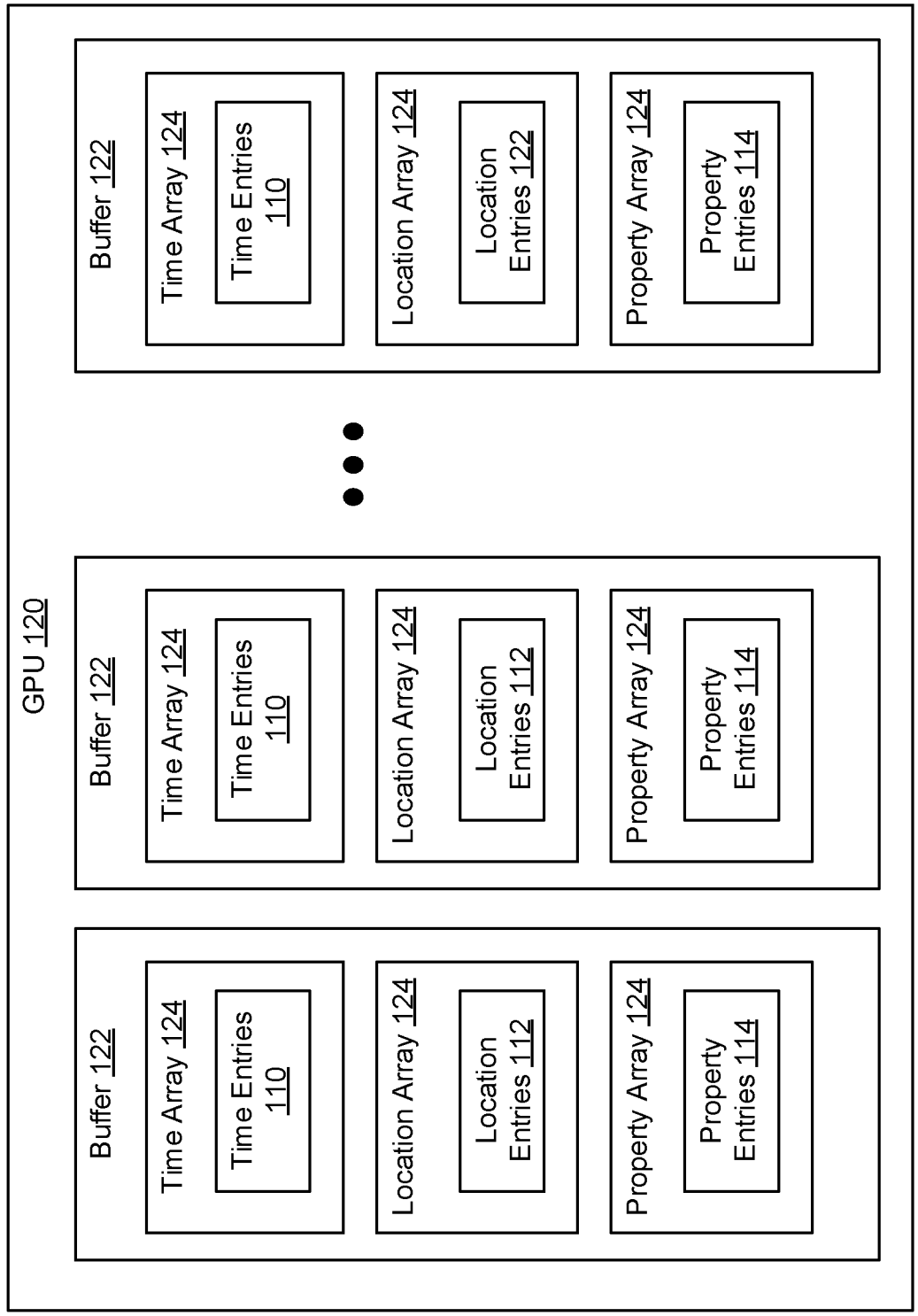
FIG. 1B is a block diagram of a graphical processing unit of a device for high speed scrubbing of airspace radar returns.

Referring to FIG. 1B, depicted is a block diagram of one embodiment of a graphical processing unit (GPU) 120 of the device 102 of FIG. 1A for high speed scrubbing of airspace radar returns. The GPU 120 can include or correspond to at least one GPU 120 of the device 102. The device 102 can partition the memory of the GPU 120 into multiple buffers 122 to store and maintain data 140 received from one or more radar systems 150 and during processing of the data 140 to generate a display 132. The GPU 120 can include any number of buffers 122 and the number of buffers 122 can be selected based in part on the amount of data 140 received and/or the number of different types of data 140. In embodiments, the GPU 120 can include a first buffer 122, a second buffer 122 and an Nth buffer 122. Each buffer 122 can include one or more arrays 124 to group and organize the data 140 based in part on the type of data 140 and/or properties of the data 140. For example, the number of arrays 124 generated can be based in part on the number of different types of data 140 (e.g., time data, location data, property data). In the illustrative embodiment of FIG. 1B, the buffers 122 include a time array 124 to store and maintain time entries 110, a location array 124 to store and maintain location entries 112, and a property array 124 to store and maintain property entries 114. In some embodiments, the buffer 122 can include multiple property arrays 124 for different types of properties, including but not limited to, elevation, radar return type, or radar system detecting the object.

The device 102 can load and store data 140 in the arrays 124 based in part on the type of data 140. For example, the device 102 can load and store time entries 110 or data 140 directed to a timestamp or time value of a radar return in the time array 124. The device 102 can load and store location entries 112 or data 140 directed to a location information (e.g., longitude values, latitude values, coordinates) of a radar return in the time array 124. The device 102 can load and store property entries 114 or data 140 directed to different properties (e.g., elevation, radar return type) of a radar return in the property array 124. As new or subsequent data 140 is received, the device 102 can update the arrays 124 to include the new data 140. For example, the device 102 can load or store the new data 140 into the arrays 124 based in part on the type of data 140 and the type of array 124. In embodiments, the device 102 can remove or discard old data 140 or data 140 beyond a determined age threshold (e.g., timestamp greater than a time threshold) to update an array 124. In some embodiments, the device 102 can apply or assign a weight value to data 140 based in part on a time the respective data 140 was received such that more recent or newer data is weighted more heavily (e.g., greater weight value) than older data 140.

Figure 2:
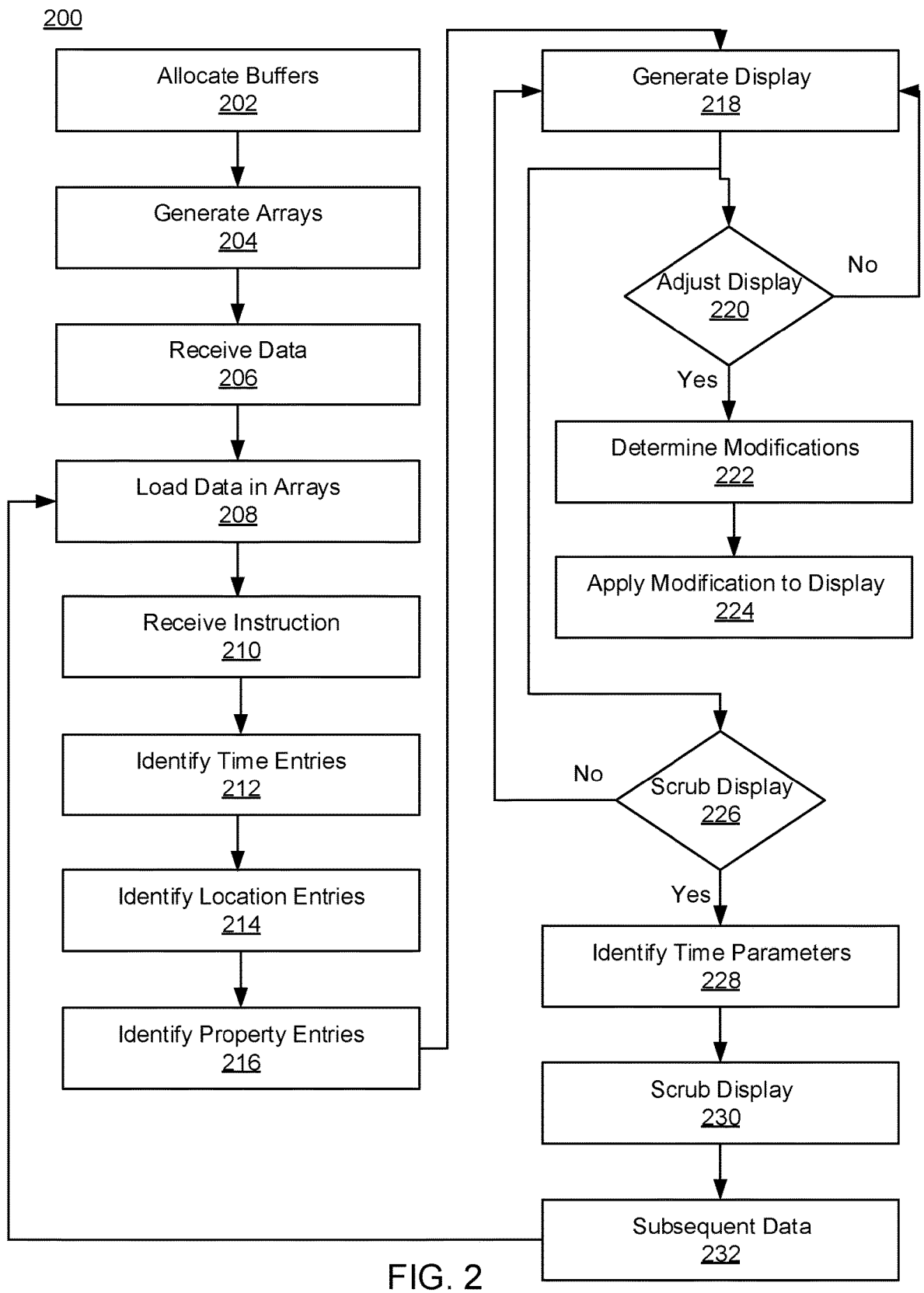
FIG. 2 is a flow diagram of a method for high speed scrubbing of airspace radar returns.

Referring now to FIG. 2, depicted is a flow diagram of one embodiment of a method 200 for high speed scrubbing of airspace radar returns. In brief overview, the method 200 can include one or more of: allocating buffers (202), generating arrays (204), receiving data (206), loading data in arrays (208), receiving an instruction (210), identifying time entries (212), identifying location entries (214), identifying property entries (216), generating a display (218), determining whether to adjust the display (220), determining modifications (222), applying modifications to the display (224), determining whether to scrub the display (226), identifying time parameters (228), scrubbing the display (230) and receiving subsequent data (232). The functionalities of the method 200 may be implemented using, or performed by, the components detailed herein in connection with FIGS. 1A-1B and 4.

Referring now to operation (202), and in some embodiments, buffers 122 can be allocated. A device 102 can allocate, in memory 108 of one or more general processing units (GPUs) 120, a plurality of buffers 122. The device 102 can include or be referred to as a data processing system having one or more central processing units 104 (e.g., processor 104) and one or more graphical processing units ("GPUs") 120. The device 102 can allocate or partition the GPUs 120 to include one or more buffers 122 to store data 140 received from one or more radar systems 150. A buffer 122 can include a data buffer or a region of the respective GPU 120 (e.g., region of memory) used to store (e.g., temporarily store) data 140 while the data 140 is being received and processed by one or more components of the device 102. In embodiments, the device 102 can allocate the buffers 122 such that one or more buffers 122 are a different size (e.g., different storage capacity) from one or more other buffers 122. In some embodiments, the device 102 can allocate the buffers 122 such that each of the buffers 122 are the same size.

In one embodiment, the device 102 can allocate three buffers 122 or three types of buffers 122. The device 102 can allocate a first one or more time buffers 122 that store the time information in one or more time arrays 124. The device 102 can allocate a second one or more location buffers 122 that store the location information in one or more location arrays 124. The device 102 can allocate a third one or more property buffers 122 that store the property information in one or more property arrays 124.

Referring now to operation (204), and in some embodiments, arrays 124 can be generated. The device 102 can generate, for storage in the plurality of buffers 122, a plurality of arrays 124. In embodiments, the arrays 124 can include, but are not limited to, location information, time information, and/or property information reorganized into a location array 124, a time array 124, and a property-based array 124. For example, in one embodiment, the device 102 can generate three arrays 124 in each buffer 122, including but not limited to, a time array 124, a location array 124 and a property array 124. The arrays 124 can include a subset or collection of data 140. For example, the device 102 can generate arrays 124 to store data 140 of a similar type (e.g., homogenous data) or data 140 related to a similar or same characteristic (e.g., time data, location data, property data) in the same array 124. The device 102 can generate any number of arrays 124 for a buffer 122. For example, the device 102 can select the number of arrays 124 to generate for a buffer 122 based in part on the number of different types of data 140.

Referring now to operation (206), and in some embodiments, data 140 can be received. The device 102 can receive data 140 from one or more radar systems 150. The data 140 can include, but is not limited to, radar returns (e.g., time-ordered airspace radar return data), air traffic data, aircraft data, weather data (e.g., precipitation), animal data (e.g., birds), and/or noise data. The data 140 can include a first plurality of time-ordered airspace radar return data 140. The device 102 can be connected to or communicate with one or more radar systems 150 to receive the data 140 at determined intervals, on a continuous basis and/or in response to a request for data 140 from the device 102.

In embodiments, the device 102 can execute a web browser application 118 to load the data 140 (e.g., airspace radar return data 140) in the application buffer using a serialized data structure format. The device 102 can receive data 140 from different radar systems 150 and assign a unique identifier (ID) to the data 140. The ID can include or indicate a timestamp of when the data 140 was recorded, a timestamp indicative of when the data 140 was received at the device 202, location information, property information and/or indicate the radar system 150 that provided the data 140. For example, the device 102 can visualize trackID based on processing a series of raw radar points from radar systems 150 and identifying which radar points (e.g., data 140) belong to a same physical object moving through space or a field of view of a particular radar system 150. The device 102 can assign each of the tracks a unique identifier.

In embodiments, the device 102 can download the data 140 into an application browser 118 (e.g., web browser, embedded browser) of a client device in a protocol buffer 122 (e.g., protobuf) format. The device 102 can encode the data 140 as an object including location information, time information and/or property information. In some embodiments, the device 102 can encode the data 140 to include the latitude information, longitude information, location information, a time stamp and/or a radar return type of the respective data 140.

Referring now to operation (208), and in some embodiments, data 140 can be loaded into one or more arrays 124. The device 102 can load, in an application buffer 122 of the device 102 (e.g., data processing system), time-ordered airspace radar return data 140. The data 140 can include a plurality of radar returns each encoded as an object. The object can include a variety of different information related to the respective data 140, including but not limited to, location information, time information and property information. The device 102 (e.g., application web browser 118) can reorganize the radar return data 140 or radar return load the data 140 into the arrays 124 of one or more buffers 122, for example, based on property and/or the type of data. In embodiments, the device 102 can load the time data 140 into a time array 124, the location data 140 into a location array 124, and the property data 140 in a property array 124. Reorganizing the radar return data 140 into property-based arrays 124 can improve computing efficiency relative to treating each radar blip as an independent entity in memory.

For example, radar blips can be independently represented as:
Blip_One={x: 500, y: 101, time: 11}
Blip_Two={x: 200, y: 202, time: 22}
Blip_Three={x: 300, y: 303, time: 33}, However, this technical solution can improve computing efficiency by rearranging the radar returns data 140 into property-based arrays in buffers 122 in memory 108 of the GPU 120 as follows, for example:
Coordinates=[500, 101, 200, 202, 300, 303]=[x1, y1, x2, y2 . . . xn, yn]
T=[11, 22, 33]=[t1, t2 . . . tn]

The device 102 can create additional arrays 124 for additional properties, beyond just location and time. For example, the device 102 can generate arrays 124 for elevation, radar return type (e.g., search only, transponder only, or reinforced with both), radar site detecting the object, or other properties.

The device 102 can partition or split up the arrays 124 using one or more techniques. For example, the device 102 can split up the arrays 124 such that the information used to draw a single vertex (e.g., point or pixel) can be collocated for read performance. For example, having separate buffers 122 for x, y, and z may cause the retrieval of data 140 from different locations for each draw operation, which can result in processing delays when drawing millions of points or pixels. Accordingly, the device 102 can use fewer buffers 122 to reduce the number of operations required to load new data 140. For example, the device 102 can use a time buffer 122, a location buffer 122, and a property buffer 122 (e.g., buffer of properties) in order to improve performance. Thus, the device 102 can store and process data 140 using one or more techniques. The device 102 can split an object into one or more different buffers 122 for readability and clarity. For example, in one embodiment, the device 102 can use three buffers 122, including but not limited to, a first buffer 122 for time, a second buffer 122 for location (x, y, and z) and a third buffer 122 for other properties (track type, etc.). In some cases, the device 102 can split up the data 140 into fewer or greater number of buffers 122, for example based on the type of GPU, or programming language (e.g., WebGL vs. Vulkan). In embodiments, each array 124 in a buffer 122 can store millions of entries. Loading the arrays 124 into the memory 108 controlled by the GPU memory 120 can be a slow process, but since the device 102 may only have to load the data 140 into the GPU memory 120 when new data 140 is updated, it may not introduce an unnecessary delay or bottleneck in the processing. The device 102 can use this structure to efficiently scrub without moving data 140 in memory 108.

Referring now to operation (210), and in some embodiments, an instruction can be received. The device 102 can receive an instruction to generate a display 132 through an input device 134 or at least one control 134 connected to the device 102. In some embodiments, the device 102 can receive an instruction to generate a display 132 through a user interaction with at least one control 134. The controls 134 can include an input device, a portion of the display 132 (e.g., touch screen), control buttons, timeline bar, and/or control wheel. The instruction can include or identify a time range (e.g., time window), location information and/or property information. For example, the instruction can include a time window 136 having a start time and an end time. The instruction can include location information such as, but not limited to, longitude values, latitude values, coordinates (e.g., global positioning system coordinates), a landmark or field of view of a radar system 150. The property information can include, but not limited to, a radar return type, an elevation, or a radar site detecting a radar return.

The device 102 can identify, responsive to the instruction to generate a display 132 for a time window 136, one or more time entries 110 in a time array 124 and/or buffer 122 stored in memory 108 of the one or more GPUs 120 that satisfy the time window 136. The device 102 can retrieve, from the location array 124 and the property-based array 124 stored in memory 108 of the one or more GPUs 120, one or more location entries 112 and one or more property-based entries 114 that correspond to the one or more time entries 110 that satisfy the time window 136.

Referring now to operation (212), and in some embodiments, time entries 110 can be identified. The device 102 can identify, based on the instruction, time entries 110 corresponding to the requested data 140 for the display 132 from one or more time arrays 124 of one or more buffers 122. The device 102 can access and retrieve time entries 110 from one or more time arrays 124. The device 102 can generate or identify a time window 136, based on the instruction, that is to be rendered in a current frame by establishing a start time and an end time for the respective time window 136. For example, the device 102 can use a time window included with the instruction to identify time entries 110 within the respective time window 136 or generate a time window 136 based on information included within the instruction. The time window 136 can include a start time and an end time for a current frame to be generated for the display 132 and the device 102 can identify time entries 110 including and/or between the start time and the end time.

The device 102 (e.g., GPU 120) can generate and execute a branching statement (e.g., an if/then) to identify data 140 having a timestamp (e.g., timestamp of a radar point) that is within the time window 136 so that the respective data 140 (e.g., one or more data points) is tagged or identified as a candidate pixel for the display 132. In some embodiments, the device 102 (e.g., GPU 120) can generate and execute a branching statement (e.g., an if/then) to discard data 140 having a timestamp (e.g., timestamp of a radar point) that is outside of the time window 136 so that the respective data 140 (e.g., one or more data points) is not identified as a candidate pixel for the display 132 and/or not used as a candidate pixel for the display 132. The device 102 (e.g., GPU 120) can use or execute a branching statement at an early point in a vertex shading process. For example, the device 102 can generate and execute a branching statement to perform or applying shading (e.g., vertex shading) to pixels representing the data 140 in the display 132. In some embodiments, to improve the processing speed of the vertex shading process, the device 102 can normalize the time into a floating point value with the desired window being between 0 and 1. For example, the device 102 can normalize the time information into floating point values between 0 and 1 and store, in a time array 124, the normalized floating point values. The device 102 can identify the one or more time entries 110 based on a comparison of a start time and a stop time of the time window 136 with the normalized floating point values. The computing overhead for the multiplication to normalize the time window 136 can be offset because the branching statement (e.g., IF statement) can reference the mantissa of the floating point value, which can be a faster operation. In embodiments, the mantissa can include the part of a floating-point number that represents the significant digits of that number, and that is multiplied by the base raised to the exponent to give the actual value of the number.

The device 102 (e.g., GPU 120) can use or execute a series of linear operations using the properties of the radar return data 140 to render a pixel or point representing data 140 in the display 132. For example, the device 102 can set an opacity for the respective pixel or point as a function of where the point falls in the determined time window 136 so that older returns are more transparent than newer returns. The device 102 can process these attributes to efficiently because the device 102 (e.g., GPU 120) can be configured to efficiently process linear functions.

Referring now to operation (214), and in some embodiments, location entries 112 can be identified. The device 102 can identify, based on the instruction, location entries 112 corresponding to the requested data 140 for the display 132 from one or more time arrays 124 of one or more buffers 122. The device 102 can access and retrieve location entries 112 from one or more location arrays 124. The device 102 can generate a location range, based on the instruction, that is to be rendered in a current frame by establishing a starting location (e.g., longitude value, latitude value) and an end location (e.g., longitude value, latitude value) for the location range. For example, the device 102 can use the location range to identify location entries 112 within the respective location range. In some embodiments, the device 102 can sort or filter the identified time entries 110 using the location range to identify data 140 that corresponds to or is included within the respective time window 136 and location range to generate a current frame for the display 132. The device 102 (e.g., GPU 120) can generate and execute a branching statement (e.g., an if/then) to identify data 140 having a location value (e.g., longitude value of a radar point, latitude value of a radar point) that is within the location range so that the respective data 140 (e.g., one or more data points) is tagged or identified as a candidate pixel for the display 132. In some embodiments, the device 102 (e.g., GPU 120) can generate and execute a branching statement (e.g., an if/then) to discard data 140 having a location value (e.g., longitude value of a radar point, latitude value of a radar point) that is outside of the location range so that the respective data 140 (e.g., one or more data points) is not identified as a candidate pixel for the display 132 and/or not used as a candidate pixel for the display 132.

Referring now to operation (216), and in some embodiments, property entries 114 can be identified.

The device 102 can identify, based on the instruction, property entries 114 corresponding to the requested data 140 for the display 132 from one or more time arrays 124 of one or more buffers 122. The device 102 can access and retrieve property entire 114 from one or more property arrays 124. The property entries 114 can include entries for, but not limited to, track type, elevation, radar return type, radar system 150 (e.g., radar site) detecting an object. In some embodiments, each property type can be stored and maintained in a unique or different property array 124.

The device 102 can extract the requested property information from the instruction and identify property entries 114 corresponding to the same property type (e.g., same track type, same elevation) for a current frame of the display 132. In some embodiments, the device 102 can sort or filter the identified time entries 110 and identified location entries 112 using the property information to further filter or reduce the data 140 and identify data 140 that corresponds to or is included within the respective time window 136, location range and includes the same property information to generate a current frame for the display 132. The device 102 (e.g., GPU 120) can generate and execute a branching statement (e.g., an if/then) to identify data 140 of the same property (e.g., within an elevation range, same radar system 150) from the property information included with the instruction so that the respective data 140 (e.g., one or more data points) is tagged or identified as a candidate pixel for the display 132. In some embodiments, the device 102 (e.g., GPU 120) can generate and execute a branching statement (e.g., an if/then) to discard data 140 of a different property (e.g., different elevation, different radar system 150) from the property information included with the instruction so that the respective data 140 (e.g., one or more data points) is not identified as a candidate pixel for the display 132 and/or not used as a candidate pixel for the display 132.

Referring now to operation (218), and in some embodiments, a display 132 can be generated. The device 102 can generate a display 132 that includes data 140 corresponding to or is included within the respective time window 136, location range and includes the same property information as indicated in the instruction to generate the display 132. The display 132 can include a current frame of data 140 that covers the respective time window 136, location range and property information. The data 140 provided within the display 132 can include a variety of different types of radar returns including, but not limited to, flight paths air traffic data, aircraft data, weather data (e.g., precipitation), animal data (e.g., birds), and/or noise data. The display 132 can be generated for an operator or user of the device 102 or a client device connected to device 102 to understand a flow of air traffic, determine whether any aircraft are behaving improperly, and classify any ambiguous radar returns that may be aircraft, weather, birds or noise for the current frame.

The device 102 can determine, based on the one or more time entries 110, an opacity level for each of the one or more pixels representing the data 140 and forming the display 132, a color or color coding for each of the one or more pixels representing the data 140 and forming the display 132. For example, the device 102 can determine an opacity level of one or more radar return data 140 provided though display 132. In embodiments, a radar return data 140 can have a different opacity level as compared to one or more other radar return data 140 provided in the display 132. The device 102 can determine a color coding (or shading) of one or more radar return data 140 provided though display 132. In embodiments, a radar return data 140 can have a different color as compared to one or more other radar return data 140 provided in the display 132. The device 102 can render the one or more frames representing the data 140 based on the opacity level and/or determined color level or color coding in the display 132.

In embodiments, the device 102 can generate a dynamic display 132 of data 140 that continuously updates or modifies the respective data 140 included within the display 132 as new or additional data 140 is received that corresponds to the time window 136, location range and includes the same property information as the current frame of the display 132. In some embodiments, the device 102 can provide the display 132 through an application 118. The device 102 can execute a web browser application 118 to load the data 140 or airspace radar return data 140 in an application buffer using a serialized data structure format. The device 102 can display the one or more frames via the web browser application 118.

Referring now to operation (220), and in some embodiments, a determination can be made whether to adjust the display 132. The device 102 can determine whether an instruction or request to adjust the display 132 has been received. For example, the device 102 can receive an instruction or request to move the current frame to a different location (e.g., different longitude range, different latitude range) such that data 140 (e.g., aircraft data, flight paths, weather) is adjusted or modified. The device 102 can receive an instruction or request to adjust one or more the time window 136, location range or one or more property types (e.g.) for the current frame of the display 132. In some embodiments, the device 102 can maintain the current frame within the display 132 until an instruction or request to adjust or otherwise modify the display 132 is received. If the device 102 does not receive an instruction or request to the adjust the display 132, the method 200 can move to (218) and the device 102 can maintain the current frame in the display 132 and wait for a next or subsequent instruction. If the device 102 receives an instruction or request to adjust the display 132, the method 200 can move to (222) and the device 102 can determine the modifications to adjust the display 132.

Referring now to operation (222), and in some embodiments, modifications can be determined. The instruction or request to adjust the display 132 can include one or more of the following: time modifications, location modifications and/or property modifications. The device 102 can extract the modification information from the instruction to determine if the modifications include time modifications, location modifications and/or property modifications.

The device 102 can receive a display adjustment comprising at least one of a combination of returns to display, a trail length of a radar return, or a color adjustment. The device 102 can apply the display adjustment to render the one or more frames within the display 132. In embodiments, the device 102 can identify, responsive to the indication to modify the display 132, one or more time entries 110 in a time array 124 and/or buffer 122 stored in memory 108 of the one or more GPUs 120 that modification instruction. The device 102 can retrieve, from the location array 124 and the property-based array 124 stored in memory 108 of the one or more GPUs 120, one or more location entries 112 and one or more property-based entries 114 that correspond to the one or more time entries 110 that satisfy the modification instruction. In embodiments, if the modifications include time modifications, the device 102 can modify the time window 136 of the current frame and identify time entries 110 corresponding to or included within the modified time window 136 from one or more time arrays 124. To identify the new time entries 110 and/or determine if any of the existing time entries 110 for the current frame correspond to the modified time window 136, the device 102 can generate a branching statement. The device 102 can execute the branching statement (e.g., an if/then) to discard data 140 having a timestamp that is outside of the modified time window 136 so that the respective data 140 (e.g., one or more data points) is not identified as a candidate pixel for the adjusted display 132 and/or not used as a candidate pixel for the adjusted display 132.

In embodiments, if the modifications include location modifications, the device 102 can modify the location range (e.g., longitude range, latitude range) of the current frame and identify location entries 112 corresponding to or included within the modified location range from one or more location arrays 124. The device 102 can generate a branching statement to identify the new location entries 112 and/or determine if any of the existing location entries 112 for the current frame correspond to the modified location range. The device 102 can execute the branching statement (e.g., an if/then) to discard data 140 having location information that is outside of the modified location range so that the respective data 140 (e.g., one or more data points) is not identified as a candidate pixel for the adjusted display 132 and/or not used as a candidate pixel for the adjusted display 132.

In embodiments, if the modifications include property modifications, the device 102 can modify the properties (e.g., elevation, radar system) of the current frame and identify property entries 114 corresponding to or included within the modified property information from one or more property arrays 124. For example, the device 102 can generate a branching statement to identify the new property entries 114 and/or determine if any of the existing property entries 114 for the current frame correspond to the modified property information. The device 102 can execute the branching statement (e.g., an if/then) to discard data 140 having property information that is different from the modified property information so that the respective data 140 (e.g., one or more data points) is not identified as a candidate pixel for the adjusted display 132 and/or not used as a candidate pixel for the adjusted display 132.

Referring now to operation (224), and in some embodiments, modifications can be applied to the display 132. The device 102 can apply the modifications to the display to adjust the display 132 or adjust a view of the display 132. The modifications can include time modifications, location modification or property modifications or any combination of time modifications, location modification and property modifications. The display 132 can be adjusted to show a different location range, different time window 136 and/or apply different properties. In some embodiments, the display 132 can be adjusted to show or apply different properties (e.g., different elevation, data from different radar systems 150) to an existing display 132. The device 102 can apply the modifications to adjust the display 132 such that the display 132 provides or illustrates data 140 corresponding to the newly identified time entries 110, location entries 112 and/or property entries 114.

Referring now to operation (226), and in some embodiments, a determination can be made whether to scrub the display 132. The device 102 can determine whether an instruction or request to scrub the display 132 has been received. For example, the device 102 can receive an instruction or request to scrub the current frame to move backward in time or forward in time. The scrubbing instruction can indicate to maintain or keep the same location range and/or property information and adjust the time window 136 to show one or more flight paths, aircraft data or aircraft behavior over multiple time windows 136. The scrubbing instruction can indicate a new time window 136, a direction (e.g., replay, backward in time, forward in time), and/or a speed to move the new time window 136. If the device 102 does not receive an instruction or request to the scrub the display 132, the method 200 can move to (218) and the device 102 can maintain the current frame in the display 132 and wait for a next or subsequent instruction. If the device 102 receives an instruction or request to scrub the display 132, the method 200 can move to (228) and the device 102 can determine the time parameters to perform scrubbing of the display 132.

Referring now to operation (228), and in some embodiments, time parameters can be determined. The device 102 can receive an indication or instruction to scrub the display 132 of at least a portion of the data 140 or the airspace radar return data 140 to a time window 136 prior to a current display time, current time window 136 or subsequent to the current display time or time window 136. For example, the scrubbing instruction can include an instruction to move backward in time or forward in time from the current time window 136 provided in display 132. The device 102 can determine the time parameters for the scrubbing instruction, including but not limited to the new time window 136, the direction (e.g., replay, backward in time, forward in time), and/or the speed to move the new time window 136. The time parameters can correspond to a user interaction with at least one control 134. The controls 134 can include a timeline bar 134 having a pointer 134 and/or a control wheel 134. The direction (e.g., backward, forward) and a speed of the scrubbing can correspond to a direction of movement received through a control 134 and a speed of the movement using control 134.

In embodiments, the device 102 can receive a scrubbing instruction through the timeline bar 134 and pointer 134 responsive to a movement of the pointer 134 along or across the timeline bar 134. The direction of movement in the time domain and speed of movement in the time domain can be arbitrary and controlled by a user through interaction (e.g., touch screen, click on, engage) with the controls 134. The device 102 can receive an indication or scrubbing instruction to scrub the display 132 of at least a portion of the data 140 (e.g., airspace radar return data) via an input interface that includes at least one graphical user interface element or a hardware wheel 134. For example, the device 102 can receive a scrubbing instruction through the control wheel 134 responsive to a movement of the wheel 134 such as, but not limited to, turning the wheel in a particular direction and at a particular rate. The controls 134 can generate instructions for device 102 to enable dynamic scrubbing, looping and boomeranging back and forth, and repeating playback.

The device 102 can identify, responsive to the indication to scrub the display 132 to the time window 136, one or more time entries 110 in a time array 124 and/or buffer 122 stored in memory 108 of the one or more GPUs 120 that satisfy the time window 136. The device 102 can retrieve, from the location array 124 and the property-based array 124 stored in memory 108 of the one or more GPUs 120, one or more location entries 112 and one or more property-based entries 114 that correspond to the one or more time entries 110 that satisfy the time window 136. The buffers 122 and arrays 124 can be time ordered such that the device 102 can update the time window 136 for the display 132 and identify time entries 110 in the time arrays 124 included within the new time window 136. In some embodiments, the data 140 is stored and maintained in the buffers 122 and arrays 124 based on a timestamp of the respective data 140. In some embodiments, the device 102 can receive the scrubbing instruction and determine a new time window 136 to render in the display 132. The device 102 can select a start time and an end time for the new time window 136 and execute a branching statement to identify data 140 having a timestamp that is within, between or includes the start time and the end time of the new time window 136 and identify the respective data 140 as a candidate pixel for the scrubbed display 132. In embodiments, to increase a speed of the scrubbing, the device 102 can normalize the time into a floating point value with the desired time window 136 being between 0 and 1. The overhead needed for the multiplication to normalize the time window 136 can be offset because the IF statement can reference only the mantissa of the floating point value, which is a faster operation. The device 102 can identify time entries 110 corresponding to the new time window 136 form one or more time arrays 124. In some embodiments, the device 102 can generate and execute a branching statement (e.g., an if/then) to discard data 140 having a timestamp that is outside of the modified time window 136 so that the respective data 140 (e.g., one or more data points) is not identified as a candidate pixel for the adjusted display 132 and/or not used as a candidate pixel for the adjusted display 132.

Referring now to operation (230), and in some embodiments, the display 132 can be scrubbed. The device 102 can render, for display via a display device 132 of the data processing system, one or more frames with one or more pixels corresponding to the one or more location entries 112, the one or more time entries 110, and the one or more property-based entries 114 that satisfy the time window 136. The device 102 can display, responsive to the indication to scrub the display 132, the at least the portion of the airspace radar return data 140 in a reverse time order and a forward time order loop corresponding to the time window 136. The device 102 can perform scrubbing on the display 132 to move backward in time or forward in time based in part on the direction indicated in the scrubbing instruction. The device 102 can perform the scrubbing to move the data 140 within the display backward or forward in time at the indicated speed and show the data 140 over a plurality of time windows 136.

In some embodiments, the device 102 can perform continuous scrubbing such that the device 102 moves the display 132 backward and/or forward in time as the devices receives each scrubbing instruction. For example, the device 102 can receive multiple scrubbing instructions (e.g., user scrolls backward and/or forward in time, user interacts with a backward and forward button multiple times) and continuously rewind or forward the display 132 based on the received scrubbing instruction. The device 102 can step backward and forward in time continuously to avoid the discontinuity problem of jumping. The device 102 can provide a user control over the speed of playback based in part on the received scrubbing instructions. For example, the device 102 can perform scrubbing to move backward and/or forward in time to show a flight path of an aircraft during multiple time windows 136 to identify abnormalities in the aircraft's behavior or determine if the behavior the respective aircraft is normal. The device 102 can perform scrubbing to move backward and/or forward in time to determine if a particular radar return corresponds to an aircraft, weather system or flock of birds. The device 102 can perform scrubbing to the display 132 to render radar returns over multiple time windows 136 to change the visualization criteria in real time and dynamically analyze radar returns from one or more radar systems 150.

In embodiments, the device 102 can dynamically modify the characteristics (e.g., coloring, shading) of the data 140 within a display 132. The device 102 can dynamically select shading and/or colors for data 140 provided within the display 132 to distinguish or differentiate one or more radar returns from one or more other radar returns provided in the display 132. For example, the device 102 can generate a display 132 having data 140 corresponding to three different radar returns. The device 102 can generate each radar return in a different color to differentiate between the different radar returns. The device 102 can generate a display 132 having data 140 corresponding to three different radar returns and highlight data 140 corresponding to the first radar return and shade data 140 corresponding to the second and third radar return to make the data 140 for the first radar return more prominent and easier to visually analyze. The device 102 can dynamically select and apply shading (e.g., shaders) with different linear functions in the rendering process to allow a user to request or select different combinations of the radar returns to view, change a trail length of one or more radar blips and/or adjust coloring of data 140 provided within the display 132. In some embodiments, the device 102 can receive a shading instruction or color instruction from a client device and modify the data 140 with the display 132 using the shading and/or color instructions provided. In embodiments, the device 102 can provide or enable three-dimensional (3D) view of the data 140 in the display 132 while enabling panning functionality, rotating functionality, and/or zooming functionality.

Referring now to operation (232), and in some embodiments, subsequent data can be received. The device 102 can receive second or subsequent radar return data 140 from one or more radar systems 150. In embodiments, the device 102 can receive second time-ordered airspace return data 140 that includes a second plurality of radar returns different from the first, original or a previous plurality of radar returns. The second or subsequent radar return data 140 can be received from one or more radar systems 150. The device 102 can determine a size for a second plurality of buffers 122 based on a size of the second plurality of radar returns and a size of the plurality of arrays 124. The device 102 can determine a number of buffers 122 and/or a number of arrays 124 based in part on the size of the second plurality of radar returns and/or the number of different types of data 140. The device 102 can allocate, in the one or more GPUs 120 based on the determined size for the second plurality of buffers 122, the second plurality of buffers 122. In embodiments, the device 102 can execute a bulk-copy of the plurality of arrays 124 from the plurality of buffers 122 to the second plurality of buffers 122. The device 102 can reorganize the second plurality of radar returns into a second plurality of arrays 124 in the second plurality of buffers 122.

The method 200 can move to (208) to load the second or subsequent data 140 into one or more arrays 124 and/or update the buffers 122 and/or arrays 124. For example, the device 102 can determine to discard data 140 to increase available memory 108 in the one or more GPUs 120. The device 102 can determine a size for a second plurality of buffers 122 that is less than a size of the original, first or previous plurality of buffers 122. The device 102 can allocate, in the one or more GPUs 120 based on the determined size for the second plurality of buffers 122, the second plurality of buffers 122. The device 102 can execute a bulk-copy of a subset of the plurality of arrays 124 from the plurality of buffers 122 to the second plurality of buffers 122. In some embodiments, the subset of the plurality of arrays 124 can be less than or not include each of the original, first or previous plurality of arrays 124. The device 102 can clear the plurality of buffers 122 responsive to the bulk-copy.

Now referring to FIGS. 3A-3D, depicted are multiple radar returns 302 in a current frame and scrubbed backward and forward in time to show the radar returns 302 over multiple time windows 136 and identify any abnormalities or other properties of the radar returns 302. The radar returns 302 are provided in a display 132 of the device 102. The display 132 can include a graphical user interface that is provided or presented via an application 118, such as a web browser. The display 132 can include dynamic controls 134, such as but not limited to a timeline bar 134 (e.g., semi-circular, horizontal, or other type of timeline bar) and a pointer 134 to enable scrubbing of the display 132. In some embodiments, the timeline bar 134 and the pointer 134 can be provided through the display 132 as interactive elements on a touch screen portion of the display 132. The display 132 can include controls to modify color or visual properties of the radar returns 302, pan, zoom, and/or rotate through a scene while maintaining the ability to scrub the display 132 through one or more time windows 136. The controls can include controls to hide one or more tracks (e.g., hide tracks corresponding to known aircraft that have transponders, or correlated tracks). The controls can include controls to color-code tracks based on the type of track (e.g., based on type of aircraft), or strength of track (e.g., amount of radar returns data received for the track, duration of the track, or correlation level of returns to a track).

Figure 3A:
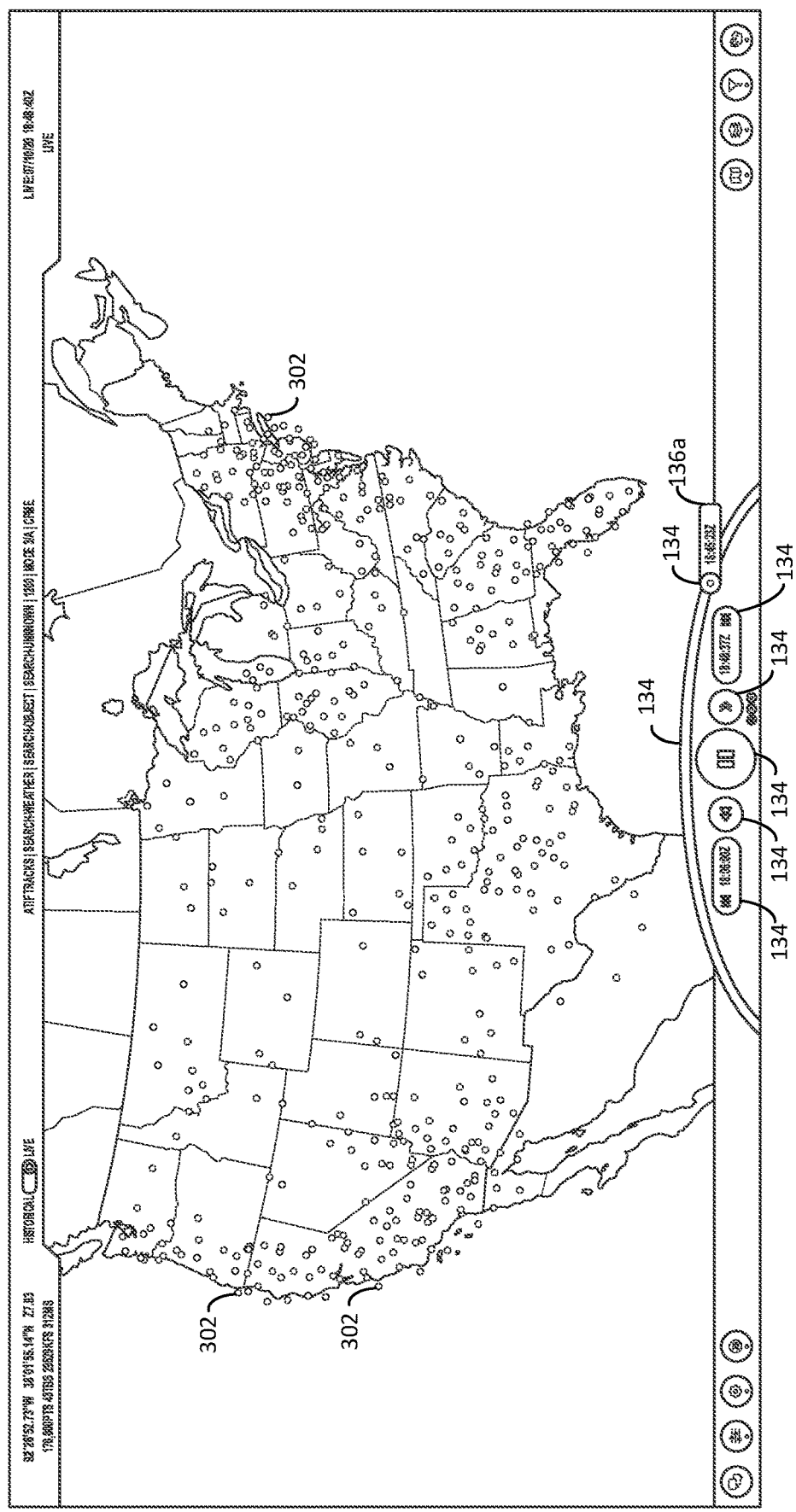
FIG. 3A is an illustrative example of a graphical user interface for scrubbing airspace radar returns in a current frame.
Figure 3B:
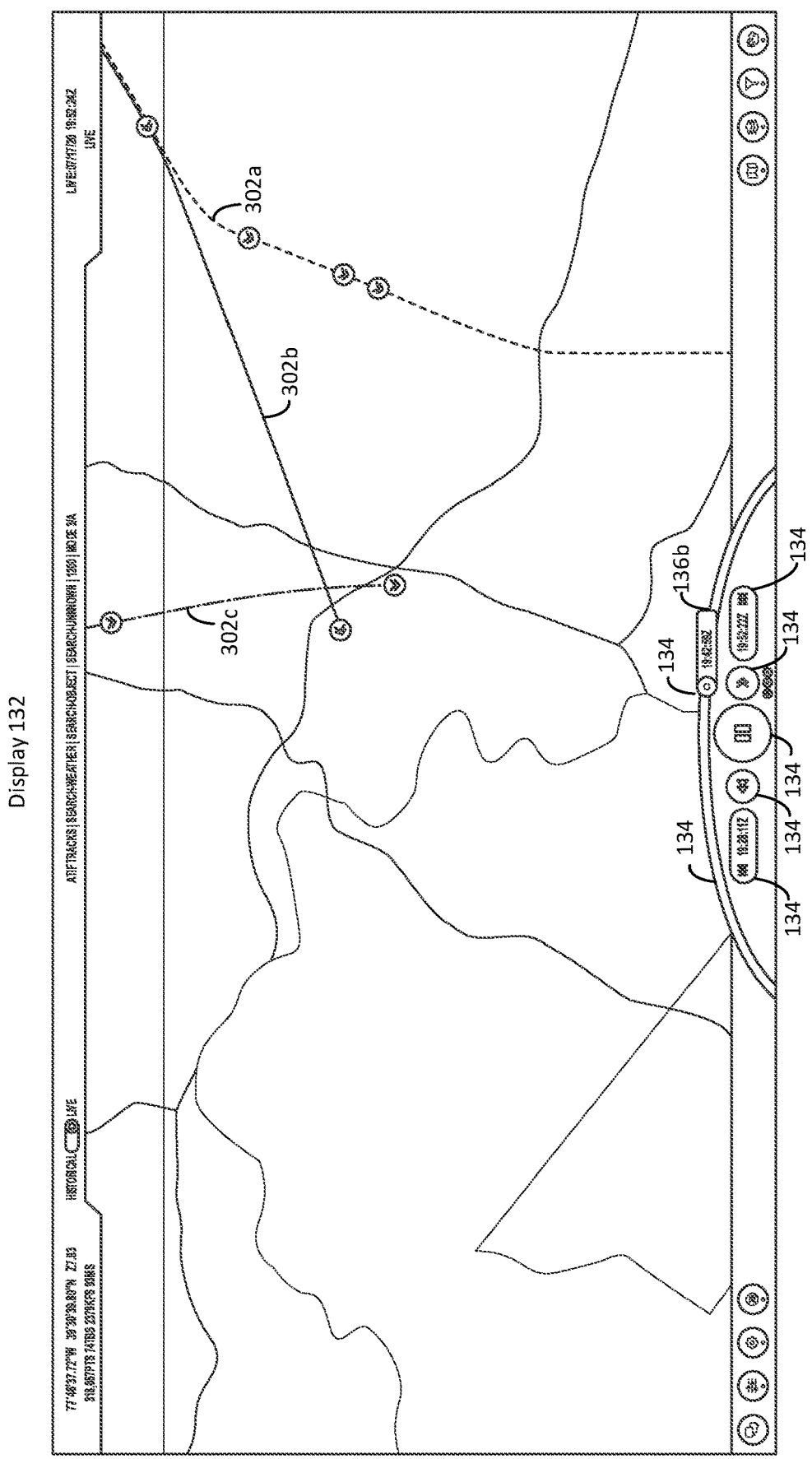
FIG. 3B is an illustrative example of a graphical user interface showing multiple radar returns scrubbed backward in time from the frame of FIG. 3A.
Figure 3C:
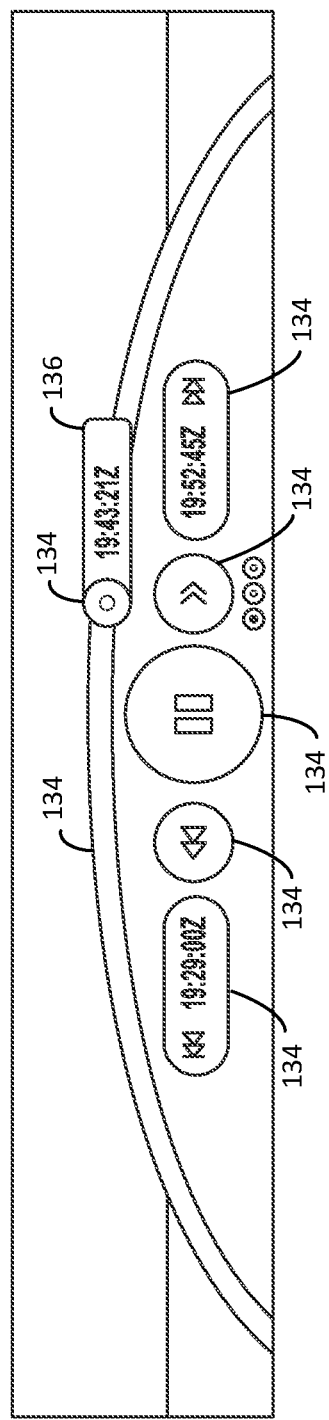
FIG. 3C is an illustrative example of a control bar of a graphical user interface for scrubbing airspace radar returns.
Figure 3D:
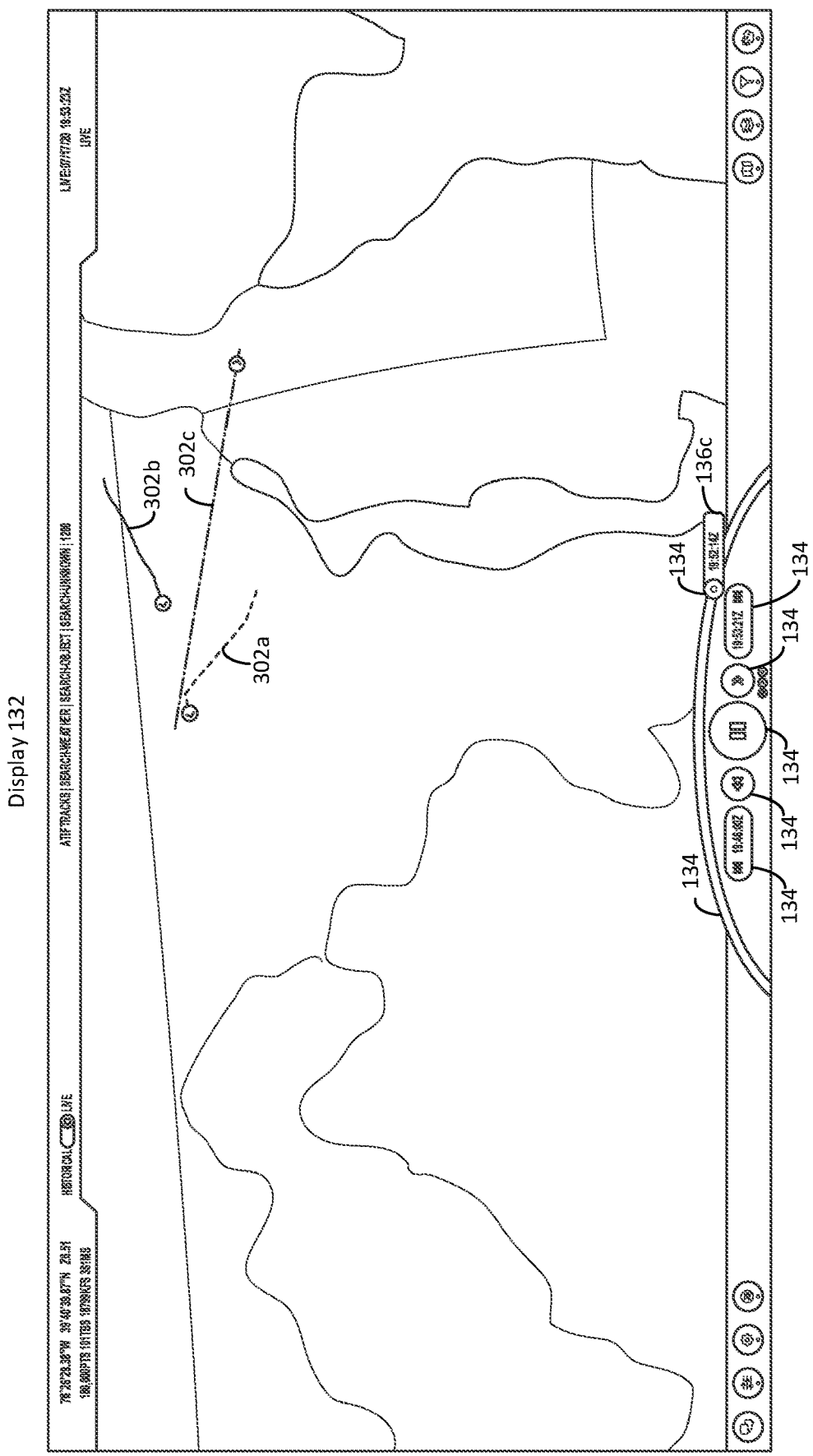
FIG. 3D is an illustrative example of a graphical user interface showing multiple radar returns scrubbed forward in time from the frame of FIG. 3A.

For example, FIG. 3A depicts a display 132 having a multiple radar returns 302 in a current frame for a first time period 136a. FIG. 3B depicts the frame of FIG. 3A and radar returns 302 scrubbed back in time for a second time period 136, prior to the first time period 136a. FIG. 3C depicts a control bar of the graphical user interface showing multiple types of controls 134 for modifying color or visual properties of the radar returns 302, for example, to pan, zoom, and/or rotate through a scene while maintaining the ability to scrub the display 132 through one or more time windows 136. FIG. 3D depicts the frame of FIG. 3A and radar returns 302 scrubbed forward in time for a third time period 136c, after the first time period 136a. In FIG. 3A, multiple radar returns 302 are illustrated over a first time window 136a. Each of the radar returns 302 can correspond to data 140 received from one or more radar systems 150. In embodiments, the radar returns 302 can include or correspond to a flight path of an aircraft, a weather system, a flock of birds and/or other objects that may generate a radar return 302 in a field of view of a radar system 150.

The device 102 can execute method 200 to generate the display 132 to show each of the radar returns, for example, to a user of the device 102 and/or a user of a client device connected to the device 102. The radar returns 302 can have different patterns and characteristics (e.g., flight path characteristics). The device 102 can monitor and analyze the radar return 302 patterns and characteristics to determine if the respective radar return is exhibiting normal behavior or abnormal behavior. For example, in some embodiments, a user monitoring air traffic data from one or more radar systems 150 (e.g., radar sites) can use the display to understand the flow of traffic for a particular area and/or over a particular time window 136 to identify aircraft, determine if any aircraft are behaving improperly, and/or to classify any ambiguous radar returns 302 that may be aircraft, weather, birds or noise.

The device 102 can provide or enable scrubbing functionality to allow a user to move backward and forward in time to analyze radar returns 302 over multiple time periods to identify aircraft, determine if any aircraft are behaving improperly, and/or to classify any ambiguous radar returns 302. The device 102 can include or be connected to one or more controls 134 to scrub the display 132 or otherwise modify visual properties of the display 132. For example, the controls 134 can include or correspond to a user interface element, input device configured to generate a scrubbing instruction and/or modification instruction to scrub the display 132 or otherwise modify visual properties of the display 132 responsive to an interaction (e.g., user interaction) with the respective control 134. In one embodiment, a control 134 can include a scrubbing wheel to move the display 132 back in time responsive to a turn or actuation in a first direction (e.g., left turn, left twist) and move the display 132 forward in time responsive to a turn or actuation in a second direction (e.g., right turn, right twist). The scrubbing wheel 134 can include software (e.g., software UI), hardware (e.g., hardware wheel) and/or a combination of software and hardware to generate a scrubbing instruction responsive to a user interaction and transmit the scrubbing instruction to the device 102.

In embodiments, the device 102 can receive a scrubbing instruction for the display 132 from a control 134 to move backward in time to a second time window 136b or time window 136b prior to the time window 136a shown in FIG. 3A. The scrubbing instruction can include an amount of time to move backward, a speed to move backward in time, and/or a new time window 136 including a start time and end time. In some embodiments, the amount of time to move backward and/or a speed to move backward in time can correspond to or be determined based in part on level of force applied to the control 34 (e.g., speed of the turn, degree of the turn). The device 102 can execute the method 200, for example, operations 226-230 of method 200 to scrub the display 132 backward in time based in part on the amount of time to move backward and/or a speed to move backward in time indicated in the scrubbing instruction. The device 102 can provide or generate the display 132 as shown in FIG. 3B to highlight or emphasize a first radar return 302a, a second radar return 302b, and a third radar return 302c, each corresponding to different flight paths. The first radar return 302a, second radar return 302b, and third radar return 302c are illustrated over a second time window 136b prior to the first time window 136a of FIG. 3A to show prior portions of the flight paths of the respective radar returns 302.

In embodiments, the device 102 can transition the display 132 backward in time in a smooth transition or continuous transition to avoid discontinuity in providing the radar returns 302 through display 132. For example, the device 102 can continuously scrub the display 132 to move the display 132 from the first time window 136a of FIG. 3A to the second time window 136b of FIG. 3B, for example, instead of jumping to the second time window 136b of FIG. 3B. The transition from FIG. 3A to FIG. 3B can appear visually smooth to a user of the device 102 or a user of a client connected to the device 102 while maintaining interactivity and the ability to change or modify visual properties (e.g., color) of the radar returns 302 provided in the display 132.

In embodiments, the device 102 can receive a second or subsequent scrubbing instruction for the display 132 from a control 134 to move forward in time to a third time window 136c or time window 136c after the time window 136a shown in FIG. 3A. The scrubbing instruction can include an amount of time to move forward, a speed to move forward in time, and/or a new time window 136 including a start time and end time. In some embodiments, the amount of time to move backward and/or a speed to move forward in time can correspond to or be determined based in part on level of force applied to at least one control 134 (e.g., speed of the turn, degree of the turn). The device 102 can execute the method 200, for example, operations 226-230 of method 200 to scrub the display 132 forward in time based in part on the amount of time to move forward and/or a speed to move forward in time indicated in the scrubbing instruction. The device 102 can provide or generate the display 132 as shown in FIG. 3D with each of the first radar return 302a, the second radar return 302b, and the third radar return 302c are illustrated over the third time window 136c that is after the first time window 136a of FIG. 3A to show subsequent portions of the flight paths of the respective radar returns 302. The device 102 can transition the display 132 forward in time in a smooth transition or continuous transition to avoid discontinuity in providing the radar returns 302 through display 132. For example, the device 102 can continuously scrub the display 132 to move the display 132 from the second time window 136b of FIG. 3B or the first time window 136a of FIG. 3A to the third time window 136c of FIG. 3D.

The device 102 can enable scrubbing functionality to move backward and forward in time through controls 134 and provide control speed of playback or modification of visual properties of the radar returns 302 in the display 132. In embodiments, the direction of movement in the time domain and speed of movement in the time domain can be arbitrary and controlled by a user through the controls 134. In some embodiments, the controls 134 can include multiple different types of control button, input devices or interaction devices. In some embodiments, the controls 134 can include a timeline bar provided and a pointer that is controlled through an input device (e.g., mouse, touch screen). The device 102 can receive a scrubbing instruction through the timeline bar, for example, responsive to a user moving the pointer along the timeline bar and the device 102 can scrub the display 132 based in part on the direction of the movement along or across the timeline bar and/or a speed of the movement along or across the timeline bar. In embodiments, the controls 134 can include a hardware device, such as but not limited to, a scroll wheel on a mouse, or an external jog wheel.

Figure 4:
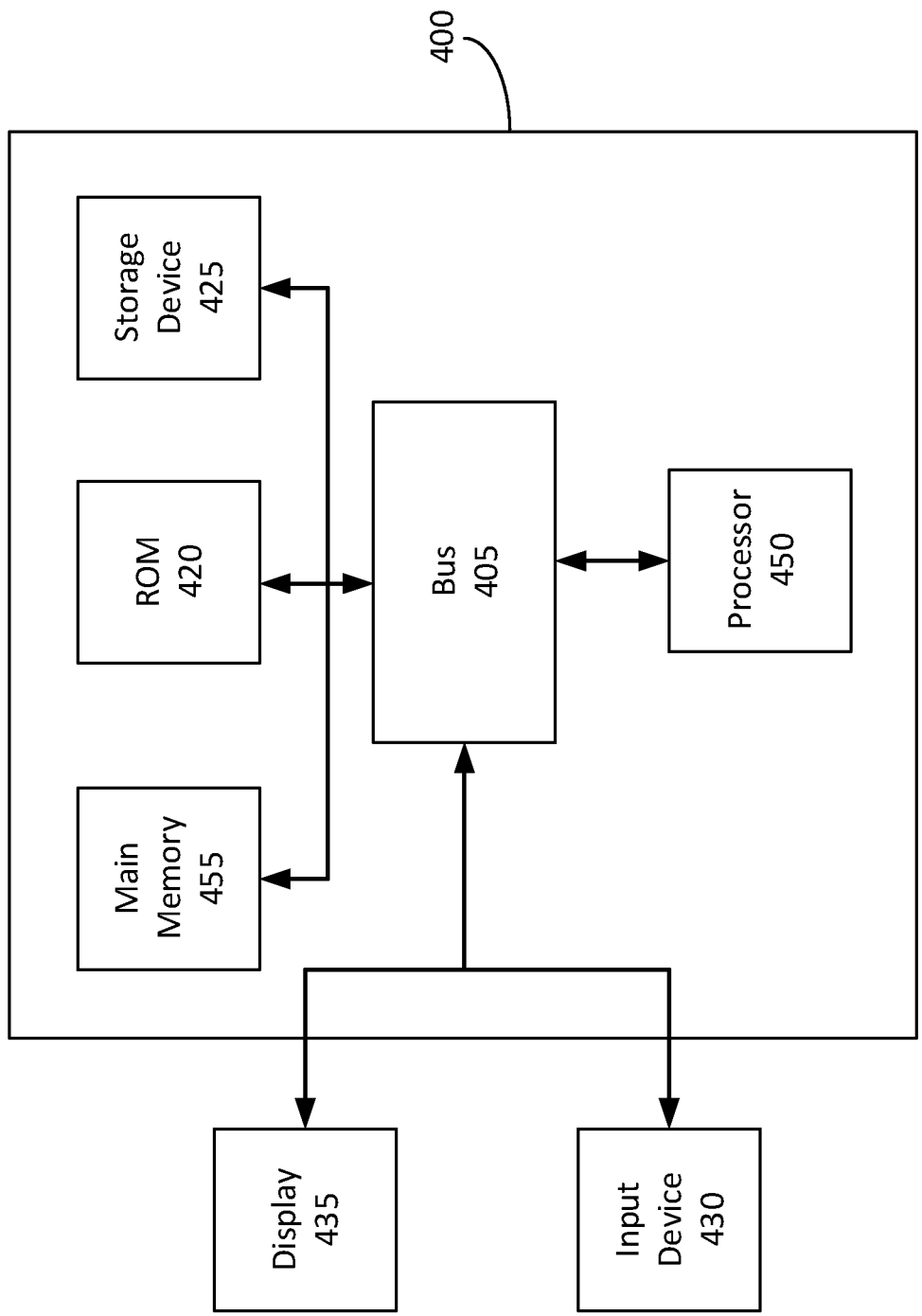
FIG. 4 is a block diagram illustrating an architecture for a computer system that can be employed to implement elements of the systems, flows and methods described and illustrated herein.

FIG. 4 is a block diagram of an example computer system 400 that can be used to implement or perform one or more functionality or element of this technical solution. The computer system or computing device 400 can include or be used to implement the device 102 (e.g., data processing system), or its components. The computing system 400 includes at least one bus 405 or other communication component for communicating information and at least one processor 410 or processing circuit coupled to the bus 405 for processing information. The computing system 400 can also include one or more processors 410 or processing circuits coupled to the bus for processing information. The computing system 400 also includes at least one main memory 415, such as a random access memory (RAM) or other dynamic storage device, coupled to the bus 405 for storing information, and instructions to be executed by the processor 410. The main memory 415 can be or include the memory 108. The main memory 415 can also be used for storing virtual machine information, hardware configuration information of the virtual machine, software configuration information of the virtual machine, IP addresses associated with the virtual machine or other information during execution of instructions by the processor 410. The computing system 400 may further include at least one read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the memory 108.

The computing system 400 may be coupled via the bus 405 to a display 435, such as a liquid crystal display, or active matrix display, for displaying information to a user. An input device 430, such as a keyboard or voice interface may be coupled to the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the device 102, the UI 130 and/or the display 132.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to scrub airspace radar returns, comprising:
a data processing system comprising one or more central processing units and one or more graphical processing units ("GPUs");
the one or more central processing units configured to:
load, in an application buffer of the data processing system, time-ordered airspace radar return data comprising a plurality of radar returns each encoded as an object comprising location information, time information, and property information; and
provide, to the one or more GPUs, the time-ordered airspace radar return data; and the one or more GPUs configured to:
allocate, in memory of the one or more GPUs, a plurality of buffers, wherein the plurality of buffers in memory of the one or more GPUs comprise:
a first one or more time buffers to store the time information in one or more time arrays;
a second one or more location buffers to store the location information in one or more location arrays; and
a third one or more property buffers to store the property information in one or more property arrays;
generate, for storage in the plurality of buffers, a plurality of arrays comprising the location information, the time information, and the property information reorganized into a location array, a time array, and a property-based array;
receive an indication to scrub a display of at least a portion of the airspace radar return data to a time window prior to a current display time or subsequent to the current display time;
identify, responsive to the indication to scrub the display to the time window, one or more time entries in the time array stored in memory of the one or more GPUs that satisfy the time window;
retrieve, from the location array and the property-based array stored in memory of the one or more GPUs, one or more location entries and one or more property-based entries that correspond to the one or more time entries that satisfy the time window; and
render, for display via a display device of the data processing system, one or more frames with one or more pixels corresponding to the one or more location entries, the one or more time entries, and the one or more property-based entries that satisfy the time window.

2. The system of claim 1, wherein the data processing system is configured to:
execute a web browser application to load the airspace radar return data in the application buffer using a serialized data structure format; and
display the one or more frames via the web browser application.

3. The system of claim 1, wherein the property information comprises at least one of a radar return type, an elevation, or a radar site detecting a radar return.

4. The system of claim 1, comprising the data processing system to:
normalize the time information into floating point values between 0 and 1;
store, in the time array, the normalized floating point values; and
identify the one or more time entries based on a comparison of a start time and a stop time of the time window with the normalized floating point values.

5. The system of claim 1, comprising the data processing system to:
determine, based on the one or more time entries, an opacity level for each of the one or more pixels; and
render the one or more frames based on the opacity level.

6. The system of claim 1, comprising the data processing system to:
receive a display adjustment comprising at least one of a combination of returns to display, a trail length of a radar return, or a color adjustment; and
apply the display adjustment to render the one or more frames.

7. The system of claim 1, comprising the data processing system to:
receive second time-ordered airspace return data comprising a second plurality of radar returns different from the plurality of radar returns;
determine a size for a second plurality of buffers based on a size of the second plurality of radar returns and a size of the plurality of arrays;
allocate, in the one or more GPUs based on the determined size for the second plurality of buffers, the second plurality of buffers;
execute a bulk-copy of the plurality of arrays from the plurality of buffers to the second plurality of buffers; and
reorganize the second plurality of radar returns into a second plurality of arrays in the second plurality of buffers.

8. The system of claim 1, comprising the data processing system to:
determine to discard data to increase available memory in the one or more GPUs;
determine a size for a second plurality of buffers that is less than a size of the plurality of buffers;
allocate, in the one or more GPUs based on the determined size for the second plurality of buffers, the second plurality of buffers; and
execute a bulk-copy of a subset of the plurality of arrays from the plurality of buffers to the second plurality of buffers; and
clear the plurality of buffers.

9. The system of claim 1, comprising the data processing system to:
receive the indication to scrub the display of at least a portion of the airspace radar return data via an input interface comprising at least one of a graphical user interface element or a hardware wheel.

10. The system of claim 1, comprising the data processing system to:
display, responsive to the indication to scrub the display, the at least the portion of the airspace radar return data in a reverse time order and a forward time order loop corresponding to the time window.

11. A method of scrubbing airspace radar returns, comprising:
the one or more central processing units configured to:
loading, by one or more central processing units ("CPUs") of a data processing system, in an application buffer of the data processing system, time-ordered airspace radar return data comprising a plurality of radar returns each encoded as an object comprising location information, time information, and property information;
providing, by the one or more CPUs to one or more graphical processing units ("GPUs") of the data processing system, the time-ordered airspace radar return data;
allocating, by the one or more GPUs, a plurality of buffers in memory of the one or more GPUs, wherein the plurality of buffers in memory of the one or more GPUs comprise:
a first one or more time buffers to store the time information in one or more time arrays;
a second one or more location buffers to store the location information in one or more location arrays; and
a third one or more property buffers to store the property information in one or more property arrays;
generating, by the one or more GPUs for storage in the plurality of buffers, a plurality of arrays comprising the location information, the time information, and the property information reorganized into a location array, a time array, and a property-based array;
receiving, by the one or more GPUs, an indication to scrub a display of at least a portion of the airspace radar return data to a time window prior to a current display time or subsequent to the current display time;
identifying, by the one more GPUs responsive to the indication to scrub the display to the time window, one or more time entries in the time array stored in memory of the one or more GPUs that satisfy the time window;
retrieving, by the one or more GPUs, from the location array and the property-based array stored in memory of the one or more GPUs, one or more location entries and one or more property-based entries that correspond to the one or more time entries that satisfy the time window; and
rendering, by the one or more GPUs for display via a display device of the data processing system, one or more frames with one or more pixels corresponding to the one or more location entries, the one or more time entries, and the one or more property-based entries that satisfy the time window.

12. The method of claim 11, comprising:
executing, by the one or more CPUs, a web browser application to load the airspace radar return data in the application buffer using a serialized data structure format; and
displaying, by the one or more GPUs, the one or more frames via the web browser application.

13. The method of claim 11, wherein the property information comprises at least one of a radar return type, an elevation, or a radar site detecting a radar return.

14. The method of claim 11, comprising:
normalizing, by the data processing system, the time information into floating point values between 0 and 1;
storing, by the data processing system in the time array, the normalized floating point values; and
identifying, by the data processing system, the one or more time entries based on a comparison of a start time and a stop time of the time window with the normalized floating point values.

15. The method of claim 11, comprising:
determining, by the one or more GPUs based on the one or more time entries, an opacity level for each of the one or more pixels; and
rendering, by the one or more GPUs, the one or more frames based on the opacity level.

16. The method of claim 11, comprising:
receiving, by the one or more GPUs, a display adjustment comprising at least one of a combination of returns to display, a trail length of a radar return, or a color adjustment; and
applying, by the one or more GPUs, the display adjustment to render the one or more frames.

17. The method of claim 11, comprising:
receiving, by the one or more GPUs, second time-ordered airspace return data comprising a second plurality of radar returns different from the plurality of radar returns;
determining, by the one or more GPUs, a size for a second plurality of buffers based on a size of the second plurality of radar returns and a size of the plurality of arrays;

allocating, by the one or more GPUs, in the one or more GPUs based on the determined size for the second plurality of buffers, the second plurality of buffers;

executing, by the one or more GPUs, a bulk-copy of the plurality of arrays from the plurality of buffers to the second plurality of buffers; and reorganizing, by the one or more GPUs, the second plurality of radar returns into a second plurality of arrays in the second plurality of buffers.

18. The method of claim 11, comprising:

determining to discard data to increase available memory in the one or more GPUs;

determining a size for a second plurality of buffers that is less than a size of the plurality of buffers;

allocating, in the one or more GPUs based on the determined size for the second plurality of buffers, the second plurality of buffers;

executing, by the one or more GPUs, a bulk-copy of a subset of the plurality of arrays from the plurality of buffers to the second plurality of buffers; and clearing, by the one or more GPUs, the plurality of buffers.

\* \* \* \* \*